US008571045B2

(12) United States Patent
Gurdan et al.

(10) Patent No.: US 8,571,045 B2
(45) Date of Patent: Oct. 29, 2013

(54) DATA STREAM ROUTER

(75) Inventors: Robby Gurdan, Graefenberg (DE);
Richard Foss, Grahamstown (ZA)

(73) Assignees: U-Man Universal Media Access Networks GmbH, Duekkeldorf (DE);
Networked Audio Solutions (proprietary) Limited, Grahamstown (ZA)

( * ) Notice: Subject to any disclaimer, the term of this patent is extended or adjusted under 35 U.S.C. 154(b) by 425 days.

(21) Appl. No.: 12/681,251

(22) PCT Filed: Oct. 2, 2008

(86) PCT No.: PCT/EP2008/063256
§ 371 (c)(1),
(2), (4) Date: Jul. 27, 2010

(87) PCT Pub. No.: WO2009/043916

PCT Pub. Date: Apr. 9, 2009

(65) Prior Publication Data

US 2010/0284417 A1    Nov. 11, 2010

(30) Foreign Application Priority Data

Oct. 4, 2007 (EP) .................................. 07117923
Oct. 5, 2007 (EP) .................................. 07117998

(51) Int. Cl.
*H04L 12/28* (2006.01)
*H04J 3/16* (2006.01)
*G06F 11/00* (2006.01)
*G08C 15/08* (2006.01)
*G01R 31/08* (2006.01)

(52) U.S. Cl.
USPC ........... 370/401; 370/229; 370/257; 370/466; 709/249

(58) Field of Classification Search
USPC .......... 370/257–285, 401–410; 709/220–224, 709/246–249; 710/310–316
See application file for complete search history.

(56) References Cited

U.S. PATENT DOCUMENTS 6,389,496 B1 * 5/2002 Matsuda ...................... 710/316
6,445,711 B1 * 9/2002 Scheel et al. ................. 370/402
(Continued)

FOREIGN PATENT DOCUMENTS

| EP | 1313265 | 11/2001 |
| WO | WO03/085892 | 10/2003 |
| WO | WO2005/055536 | 6/2005 |

OTHER PUBLICATIONS

"XFN-Cross Fire Network—Wikipedia"—XP-002533830 XFN-Cross Fire Network aus Wikipedia, der freien Enzyklopedie; http://de.wikipedia.org/w/index.php?title=XFN-Cross_Fire_Network&oldid=21303855"; one page, dated Jun. 24, 2009.

(Continued)

*Primary Examiner* — Man Phan
(74) *Attorney, Agent, or Firm* — Westman, Champlin & Koehler, P.A.

(57) ABSTRACT

The present invention concerns a router for providing isochronous data transfer and asynchronous data transfer on the basis of a predetermined protocol between devices of different network sections connected to the router, when a connection management application executed by the router translates a user request to transfer data from a transmitting device of a first network section to a receiving device of a second network section into commands of the protocol for establishing a first data connection between the transmitting device and the router and a second data connection between the router and the receiving device when the data is transferred from the transmitting device via the established data connections to the receiving device.

18 Claims, 16 Drawing Sheets

(56) References Cited

U.S. PATENT DOCUMENTS

| | | | |
|---|---|---|---|
| 6,519,671 B1 * | 2/2003 | Kondou et al. | 710/311 |
| 7,007,078 B2 * | 2/2006 | Matsuda | 709/220 |
| 7,043,594 B2 * | 5/2006 | Fukushima et al. | 710/314 |
| 7,269,137 B2 * | 9/2007 | Bizet et al. | 370/230.1 |
| 7,317,734 B2 * | 1/2008 | Joy et al. | 370/466 |
| 7,321,592 B2 * | 1/2008 | Scheel et al. | 370/402 |
| 7,660,935 B2 * | 2/2010 | Lietz et al. | 710/311 |
| 8,005,021 B2 * | 8/2011 | Thomas et al. | 370/257 |
| 2001/0047431 A1 * | 11/2001 | Eytchison | 709/249 |
| 2005/0165965 A1 * | 7/2005 | Henry et al. | 709/249 |
| 2005/0259600 A1 * | 11/2005 | Chaney | 370/257 |
| 2007/0133404 A1 | 6/2007 | Gaedeken et al. | |

OTHER PUBLICATIONS

Communication pursuant to Article 94(3) Epc for related application No. 07117923.8-2413/2045969; date Oct. 9, 2009; one page.

EP Communication from EP 08835614.2, dated Oct. 22, 2010, 4 pgs.

* cited by examiner

Fig. 10
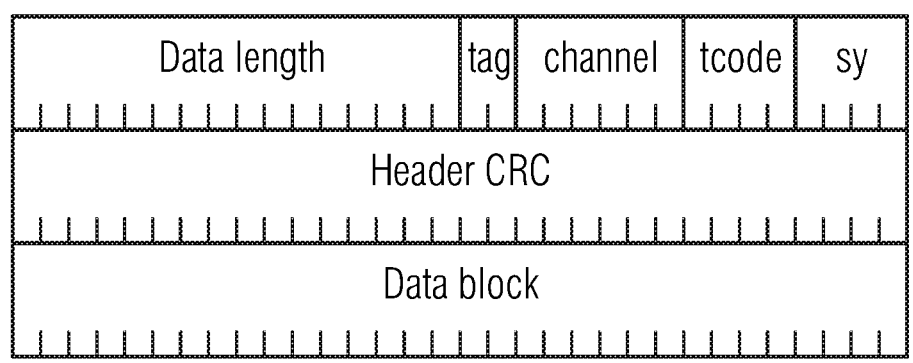
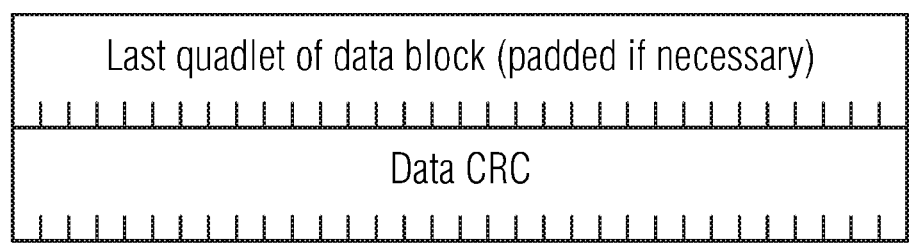

DATA STREAM ROUTER

TECHNICAL BACKGROUND

The invention relates to a router and a method for providing isochronous data transfer and asynchronous data transfer on the basis of a predetermined protocol between devices of different network sections connected to the router.

Currently, there are commercially available devices that can transmit isochronous audio packets, isochronous video packets and IP-packets from an IEEE 1394-capable device to other IEEE 1394-capable devices that reside on the same IEEE 1394-bus as the transmitting device. IEEE 1394 is also known as firewire. IEEE 1394 is a standard for isochronous and asynchronous data transfer. There are different IEEE data transfer protocols, such as IEEE 1394, IEEE 1394a, IEEE 1394b, IEEE 1394c and IEEE 1394.1.

Devices connected to an IEEE 1394-bus incorporate a non-permanent device identification having n=6 bits. Therefore, current IEEE 1394-networks are limited to 63 devices and there is no isolation of devices to separate buses. All devices connected to an IEEE 1394-bus are exposed to all bus resets within this network section. As a consequence of a bus reset, the device-ID of each device is reset and each device gets a new device-ID. This means that the device-identification of each device in the network section is non-permanent and will change with each bus reset. A bus reset is triggered by any change of the network topology, such as adding a new device to the network.

In IEEE 1394.1 a bridge between IEEE 1394-buses is specified. The specified IEEE 1394.1 bridge does not provide for control over the transmission of asynchronous packets from one bus to another. Since IP-control messages are carried by asynchronous packets, the conventional IEEE 1394.1 bridge as specified does not allow for security measures to be put in place with regard to across bridge control over devices.

The conventional IEEE 1394.1 bridge as specified allows the transfer of isochronous and asynchronous data only if the devices are bridge-aware. Conventional devices are not capable of interpreting messages received from a bridge, such as an IEEE 1394.1-bridge. An IEEE 1394.1-bridge can provide an isochronous and asynchronous data transfer between devices of different network sections connected to the bridge only if the transmitting device which is connected to a first network section and a receiving device which is connected to a second network section are both bridge-aware. However, there is a plurality of devices in the field which are not bridge-aware.

Accordingly, it is an object of the present invention to provide a router and a method allowing isochronous and asynchronous data transfer between devices of different network sections wherein the devices do not have to be able to respond to messages from the router.

SUMMARY OF THE INVENTION

The invention provides a router for providing isochronous data transfer and asynchronous data transfer on the basis of a predetermined protocol between devices of different network sections connected to the router, wherein a connection management application executed by the router translates a user request to transfer data from a transmitting device of a first network section to a receiving device of a second network section into commands of the protocol for establishing a first data connection between the transmitting device and the router and a second data connection between the router and the receiving device, wherein data is transferred from the transmitting device via the established data connections to the receiving device.

In an embodiment of the router, the isochronous data transfer comprises
an IEEE 1394 data transfer,
an IEEE 1394a data transfer,
an IEEE 1394b data transfer, and
an IEEE 1394c data transfer.

In an embodiment of the router according to the present invention, the transfer data is formed by isochronous data or by asynchronous data.

In an embodiment of the router according to the present invention, the transferred isochronous data comprises isochronous data streams.

In an embodiment of the router according to the present invention; the transferred isochronous data streams are formed by time constrained data streams, such as multimedia data streams.

In an embodiment of the router according to the present invention, the transferred isochronous and asynchronous data comprises data packets each having a header and payload data.

In an embodiment of the router according to the present invention, the router comprises at least two portals for receiving and transmitting data packets of a data network section connected to said portal.

In an embodiment of the router according to the present invention, a data packet received by a portal is inserted into an incoming message queue of said portal.

In an embodiment of the router according to the present invention, when a data packet is inserted into a message queue of a portal a thread is activated to process the data packets of said message queue.

In an embodiment of the router according to the present invention, each device comprises a non-permanent device identification (device-ID) having n bits.

In an embodiment of the router according to the present invention, each portal of said router comprises
$2^n$ output sockets for transmitting isochronous data streams via a network section connected to said portal and
$2^n$ input sockets for receiving isochronous data streams via said network section connected to said portal.

In an embodiment of the router according to the present invention, the non-permanent device identification (device-ID) comprises n=6 bits.

In an embodiment of the router according to the present invention, each output socket of a portal is configurable to stop transmitting data.

In an embodiment of the router according to the present invention, each input socket of a portal is configurable to stop receiving data.

In an embodiment of the router according to the present invention, each input socket of a portal is configurable in such a way that it will receive isochronous data streams from a transmitting device of a network section connected to said portal.

In an embodiment of the router according to the present invention, each input socket of a portal is configurable to rebundle and transmit isochronous data streams to a receiving device of a network section connected to the portal or any of its co-portals.

In an embodiment of the router according to the present invention, each non-read-only parameter of a socket of a portal is configurable.

In an embodiment of the router according to the present invention, the parameters of a socket are selectable by a user by means of a hierarchical access provided by a menu.

In an embodiment of the router according to the present invention, the parameters of an input socket of a portal comprise an isochronous data stream number and a number of sequences contained in said isochronous data stream.

In an embodiment of the router according to the present invention, the parameters of an output socket of a portal comprise an isochronous data stream number, a sample rate, a transmission speed, and a number of sequences contained in said isochronous data stream.

In an embodiment of the router according to the present invention, the router processes control data packets of a hierarchical command and control protocol received at a portal of said router.

In an embodiment of the router according to the present invention, each portal comprises a physical layer for an isochronous and asynchronous data transfer protocol.

In an embodiment of the router according to the present invention, the network section comprises a subnet, such as an IEEE 1394-bus to which devices are connected.

In an embodiment of the router according to the present invention, each device comprise a permanent device-IP address having m bits.

In an embodiment of the router according to the present invention, the permanent device-IP address comprises m=32 or 128 bits.

In an embodiment of the router according to the present invention, each isochronous data stream transmitted by a device comprises a header having a n bit data stream number of the transmitting device and payload data consisting of time constrained data.

In an embodiment of the router according to the present invention, for each portal of said router a corresponding configurable IP-address and a configurable host name is stored in a memory of said router.

In an embodiment of the router according to the present invention, the router comprises an IP and/or 1394-module for each portal for handling IP/1394-data packets each having an IP/1394-header and for handling ARP data packets.

In an embodiment of the router according to the present invention, the router comprises an IP-stack module for handling IP-data packets each having an IP-header.

In an embodiment of the router according to the present invention, the router comprises a UDP-module for handling UDP-data packets each having a UDP-header.

In an embodiment of the router according to the present invention, the router comprises a command and control module for handling control data packets of a connection management application wherein the control data packets are formatted according to a hierarchical command and control protocol.

In an embodiment of the router according to the present invention, the IP-stack module comprises a configurable routing table.

In an embodiment of the router according to the present invention, each entry of said routing table comprises a subnet address of a network section connected to a portal of the router, a subnet mask for the network section, an indication whether a routing is direct or not, a portal number of a portal of the router capable of forwarding a received data packet to the receiving device, an IP-address of another router capable of forwarding a received data packet to the receiving device.

In an embodiment of the router according to the present invention, the router comprises an execution unit for executing the connection management application formed by a Field Programmable Gate Array (FPGA).

In an embodiment of the router according to the present invention, a physical layer of each portal is connected to a link layer unit of the Field Programmable Gate Array (FPGA).

In an embodiment of the router according to the present invention, the router is a multimedia data stream router which routes isochronous multimedia data packets and IP-data packets between network sections connected to portals of the multimedia data stream router.

In an embodiment of the router according to the present invention, the router comprises an input unit to input the user request.

In an embodiment of the router according to the present invention, the user request is received via an input unit by the connection management application.

In an embodiment of the router according to the present invention, the user request is received from an external device.

In an embodiment of the router according to the present invention, the commands are transmitted in Internet Protocol packets.

In an embodiment of the router according to the present invention, the router comprises a configuration interface for the command and control module.

The invention further provides a method for transferring data from a transmitting device of a network section to a receiving device of another network section by providing commands of a connection management protocol for establishing a first data connection between the transmitting device and a router and for establishing a second data connection between router and the receiving device.

In an embodiment of the method according to the present invention, the commands are provided by translating a user request by a connection management application into commands In an alternative embodiment of the method according to the present invention, the commands are received by the router from an external device.

BRIEF DESCRIPTION OF THE FIGURES

In the following, preferred embodiments of the router and the method for transferring data are explained in more detail with reference to the enclosed figures.

FIG. 10 shows a data format of an isochronous data packet as employed by the router according to the present invention.

DETAILED DESCRIPTION OF EMBODIMENTS

Figure 1:
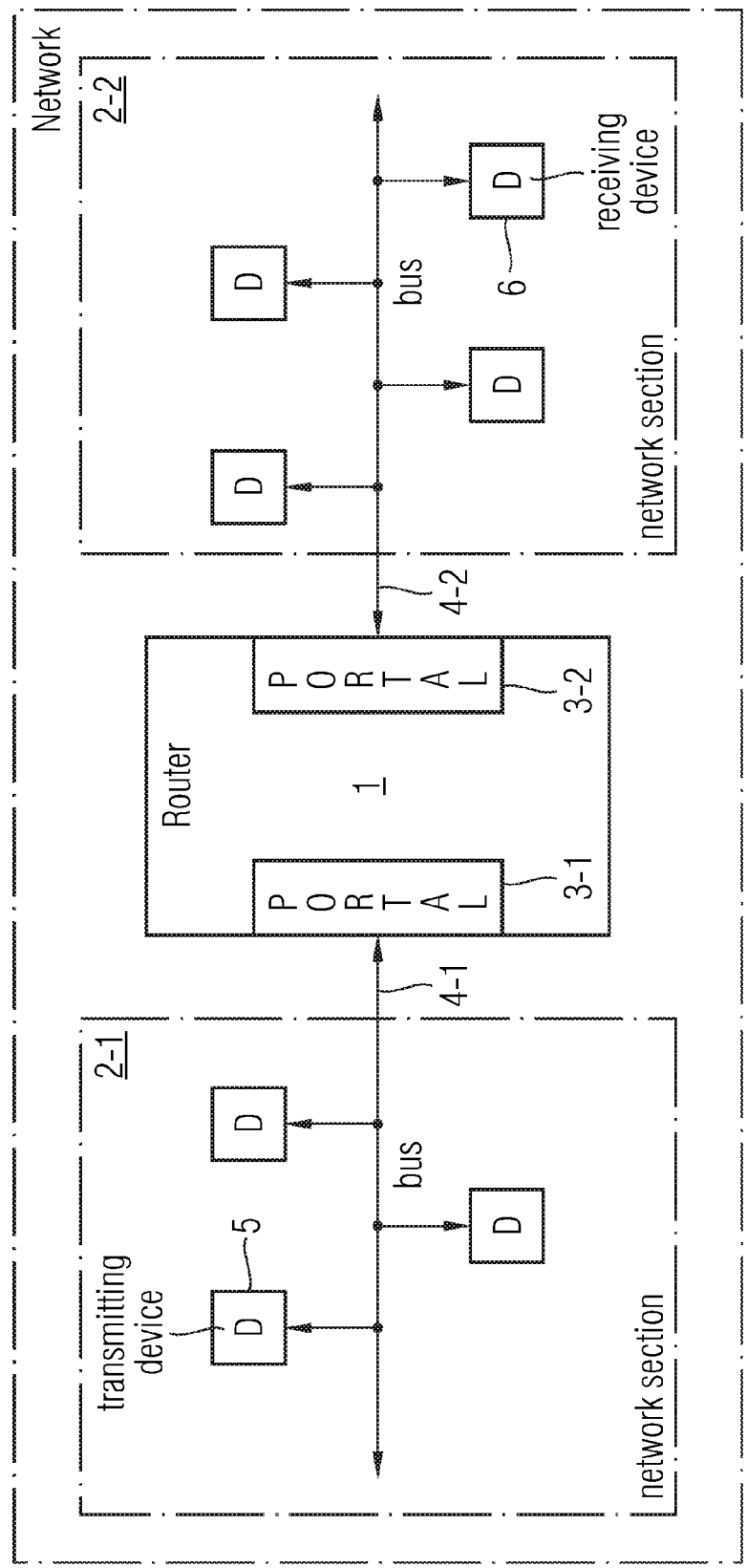
FIG. 1 shows a block diagram of a system comprising a router according to an exemplary embodiment of the present invention.

As can be seen from FIG. 1, a router 1 according to the present invention is provided between at least two different network sections 2-1, 2-2 of a network. The router 1 comprises at least two portals 3-1, 3-2 for receiving and transmitting data packets of a network section connected to the respective portal. The network sections 2-1, 2-2 each comprise a bus 4-1, 4-2 connected to a corresponding portal 3-1 or 3-2 of the router 1. The bus 4-1 or 4-2 are in a preferred embodiment a serial bus, such as an IEEE 1394 bus (firewire). To each bus 4-1 or 4-2 several devices D indicated with 5 or 6 are connected. The serial bus 4-1 can be an IEEE 1394 bus to which up to 63 devices are connected.

A connection management application is executed by a router as shown in FIG. 1. This connection management application translates a user request to transfer data from a transmitting device 5 of the first network section 2-1 to a receiving device 6 of the second network section 2-2 to commands of a predetermined protocol. These commands are commands for establishing a first data connection between the transmitting device 5 and the router 1 and a second data connection between the router 1 and the receiving device 6. After the first and second data connection have been established data from the transmitting device 5 is transferred via the router 1 to the receiving device 6.

The router 1 provides an isochronous data transfer and asynchronous data transfer on the basis of a protocol, such as IEEE 1394, IEEE 1394.a, IEEE 1394.b, and IEEE 1394.c.

In a possible embodiment, the router 1 comprises an input unit (not shown in the figure) to input a user request, such as a keyboard or a switch. The connection management application executed by the router 1 reads the user requests via the input unit. These requests are subsequently translated or converted by the connection management application to commands of the used protocol.

In an embodiment, the commands are received by the router 1 within Internet Protocol packets. The data transferred via the router 1 is formed by isochronous data or asynchronous data. Transferred isochronous data comprises isochronous data streams. These isochronous data streams are formed by time constrained data streams, such as multimedia data streams. Time constrained means and the transferred data have a fixed time relationship. The multimedia data is, for example, audio data or video data. The transferred isochronous data can also be formed by other data having a predetermined time relationship, such as data for controlling a robot which controls an actor such as a robot arm to follow a predetermined movement path. Each transferred isochronous and asynchronous data comprises data packets each having a header and a payload. A data packet received by a portal 3 of the router 1 is inserted into an incoming message queue of the portal 3. When the data packet is inserted into a message queue of the portal 3 a thread is activated to process the data packets of the message queue. The device in the network section comprises a non-permanent device identification (device-ID) comprising n bits. Further, each device comprises a permanent device IP-address having m bits.

In a possible embodiment, the non-permanent device-ID comprises n=6 bits and the permanent device IP-address comprises m=32 or 128 bits.

Figure 2:
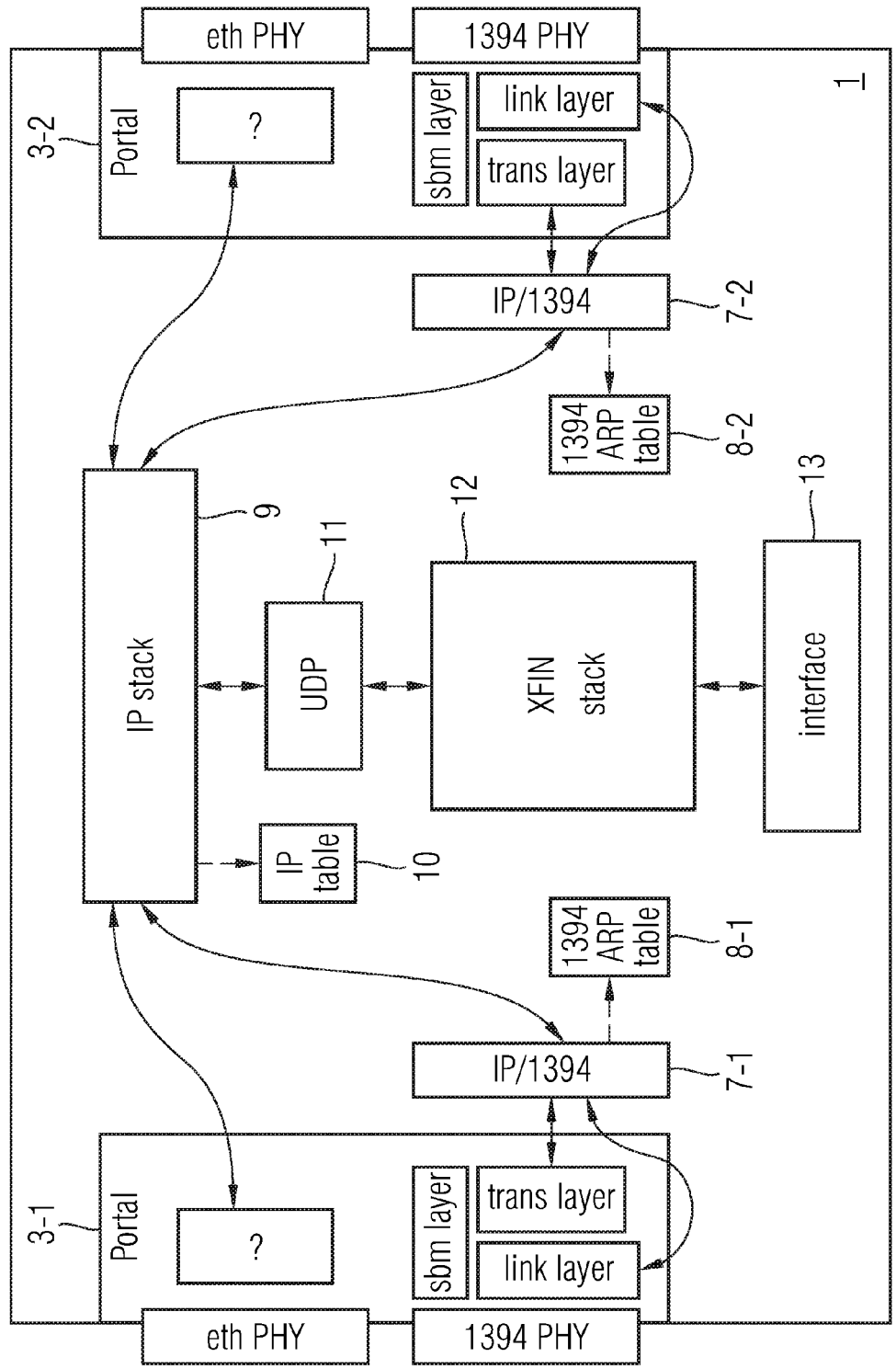
FIG. 2 shows a block diagram of a possible embodiment of the router according to the present invention.

FIG. 2 shows a block diagram of a possible embodiment of the router 1 as shown in FIG. 1.

The router 1 comprises at least two portals 3-1, 3-2. Each portal 3-1, 3-2 of the router 1 can implement either an IEEE 1394 or an Ethernet PHY or both. The IEEE 1394 PHY of a portal 3 implements a protocol stack including a serial bus management layer (SBM layer), a link layer and a transaction layer. For each portal 3 of the router 1a corresponding configurable IP-address and a configurable host name can be stored in a memory of the router 1.

As can be seen from FIG. 2, the router 1 comprises an IP/1394 module 7-1, 7-2 for each portal 3-1, 3-2 of the router. The IP/1394 module 7-1 and 7-2 is provided for handling IP/1394 data packets. The IP/1394 module have access to ARP table 8-1, 8-2 for handling ARP data packets. The ARP tables 8-1 and 8-2 have necessary parameters required for IP address resolution. The 1394 ARP parameters comprise a physical ID, GUID, a maximum record size, and a maximum speed of the node. Furthermore, the ARP parameters comprise an IP-address of a node and an IP-unicast FIFO address of the node. The IP/1394 modules 7-1 and 7-2 of the router 1 handle IP-1394 and 1394 ARP data packets structured and defined according to RFC2734. The module processes encapsulation headers are defined by RFC2734.

As can be seen from FIG. 2, the router 1 according to the shown embodiment further comprises an IP-stack module 9. The IP-stack module 9 is provided for handling IP-data packets each having an IP-header. The IP-stack module 9 handles, for example IPv4 datagrams and IPv6 datagrams by processing IP-headers. The IP-stack module 9 has access to an IP-table 10 and is connected to a UDP-module 11. The UDP-module 11 is provided for handling UDP data packets each having an UDP header.

As can be seen from FIG. 2, the router 1 further comprises a command and control module 12 (XFN-stack) for handling control data packets or messages. The command and control module 12 handles, for example control data packets or messages of the connection management application run on the router 1. These control data packets are formatted according to a hierarchical command and control protocol, i.e. an XFN-protocol.

When an incoming data packet is to be communicated to the IP-stack 9, an IP/1394-module 7-1 and 7-2 strips the relevant 1394-header. When an incoming data packet is to be communicated to the UDP-module 11, the IP-stack module 9 strips the relevant IP-header. When an incoming data packet is to be communicated to the command and control module 12, the UDP-module strips the relevant UDP-header. Datagrams received by the XFN-command and control module 12 are formatted according to a command and control protocol.

The router 1 as shown in FIG. 2 further comprises a configuration interface 13 connected to the command and control module 12.

The router 1 as shown in FIG. 2 implements both, an IP- and UDP-stack capable of processing IP-based command, and control messages received by the router 1. The IP-stack module 9 has access to an IP-routing table 10 that specifies network routing information.

Figure 13:
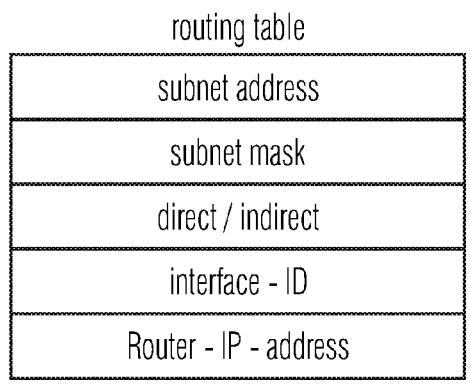
FIG. 13 shows a diagram for illustrating the data content of a routing table within a router according to the present invention.

The routing table 10 comprises for each device within the network a data entry. As shown in FIG. 13, the routing table comprises as data entries a subnet address, a subnet mask, an indication whether a routing is direct or not, an interface-ID and a router IP-address. The subnet address indicates the address of a network section. The subnet mask is provided for masking the network section. An indication is given whether the routing is to be performed directly or not. Further, the routing table comprises a portal number (interface-ID) of a portal 3 of the router 1 capable of forwarding a received data packet to the receiving device 6 in FIG. 1. Furthermore, an IP-address of another, closest router is given capable of forwarding a received data packet to the receiving device 6.

A possible entry of the routing table is for example:
subnet address=123.456.789.0
subnet mask=255.255.255
direct=yes
interface-ID=1
router IP-address=123.456.791.3

The router 1 as shown in FIG. 2 allows for IP-level routing of IP-packets carried on a serial bus, such as a firewire, between devices that implement an IP over a firewire stack. Each bus 4 forms an independent subnet.

Figure 3:
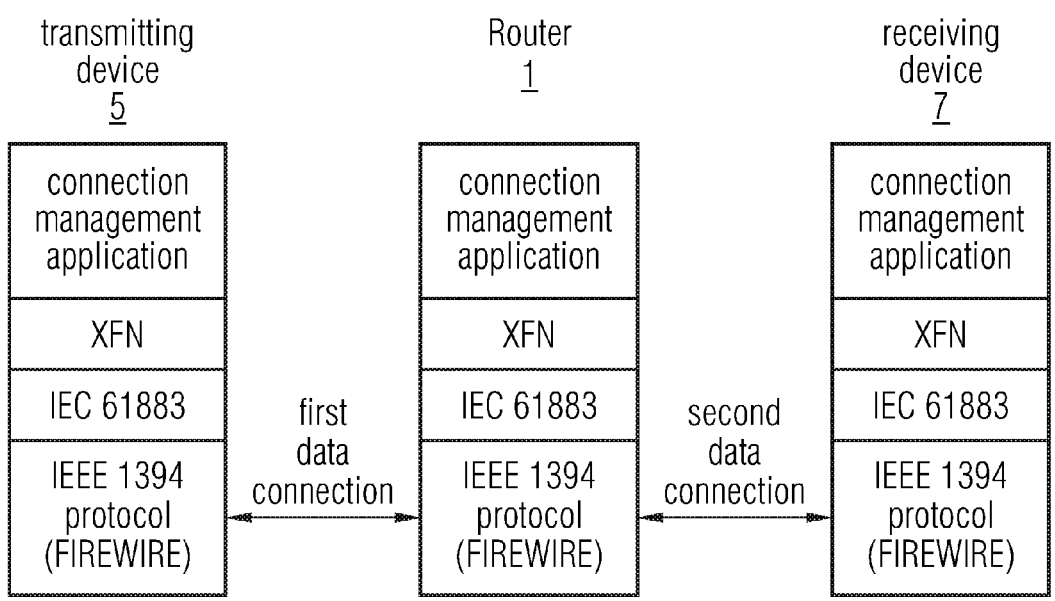
FIG. 3 shows a protocol layer diagram for illustrating the functionality of a router according to the present invention.

FIG. 3 shows a diagram for illustrating a functionality of the router 1 according to the present invention. A connection management application can be executed by the router 1. The connection management application executed by the router 1 is in one embodiment formed by a connection management application program. IEC61883 is an example for a description of media data packets indicating packet formats. The connection management application runs in a possible embodiment also on the transmitting device 5 and on the receiving device 7. The connection management application is based on an isochronous data transfer protocol, such as the IEEE 1394-protocol (firewire). A user request to transfer data from the transmitting device 5 of the first network section 2-1 to a receiving device 6 of the second network section 2-2 as shown in FIG. 1 is translated by the connection management application to commands of the underlying protocols. These commands establish a first data connection between the transmitting device 5 and the router 1 and a second data connection between the router 1 and the receiving device 7 as illustrated in FIG. 3. After the establishment of the first and the second data connection, the data is transferred from the transmitting device 5 across the router 1 to the receiving device 7. The transferred data will be isochronous data.

Devices, in particular the transmitting device 5 and the receiving device 7 can be any device connectable to a serial bus 4. The devices can be, for example loudspeakers, CD-players, DVD-players, mixers, analog/digital converters, HiFi-devices, television devices, video devices, computers, PCs or video cameras.

Figure 4:
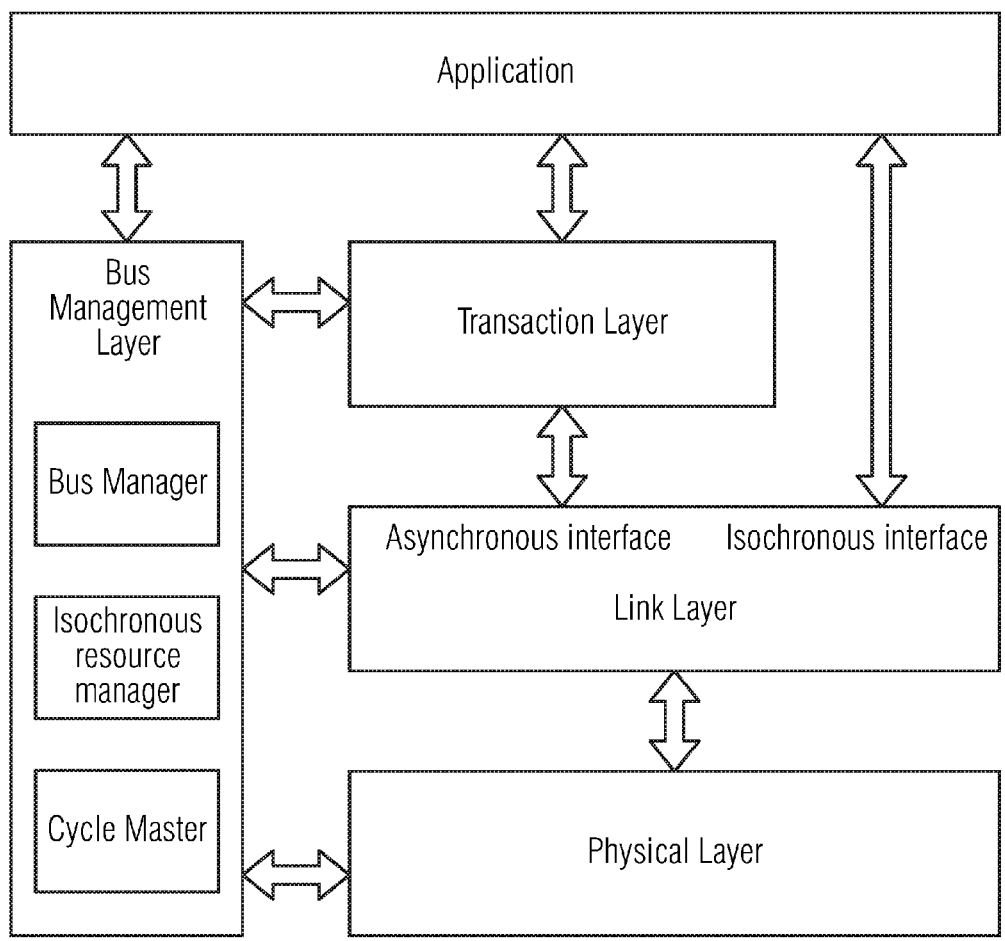
FIG. 4 shows a further layer diagram for illustrating the functionality of a router according to the present invention.

FIG. 4 shows a diagram for illustrating protocol layers of an IEEE 1394-protocol as shown in FIG. 3. The application layer as shown in FIG. 4 can be formed by an IP layer, an XFN stack layer, and a connection management application. The IEEE 1394-protocol layers include a transaction layer, a link layer and a physical layer. The link layer comprises an asynchronous interface to the transaction layer and an isochronous interface to the application. A bus management layer communicates with the application, with the transaction layer, with the link layer, and with the physical layer. The bus management layer comprises a bus manager, an isochronous resource manager and a cycle master.

Figure 5:
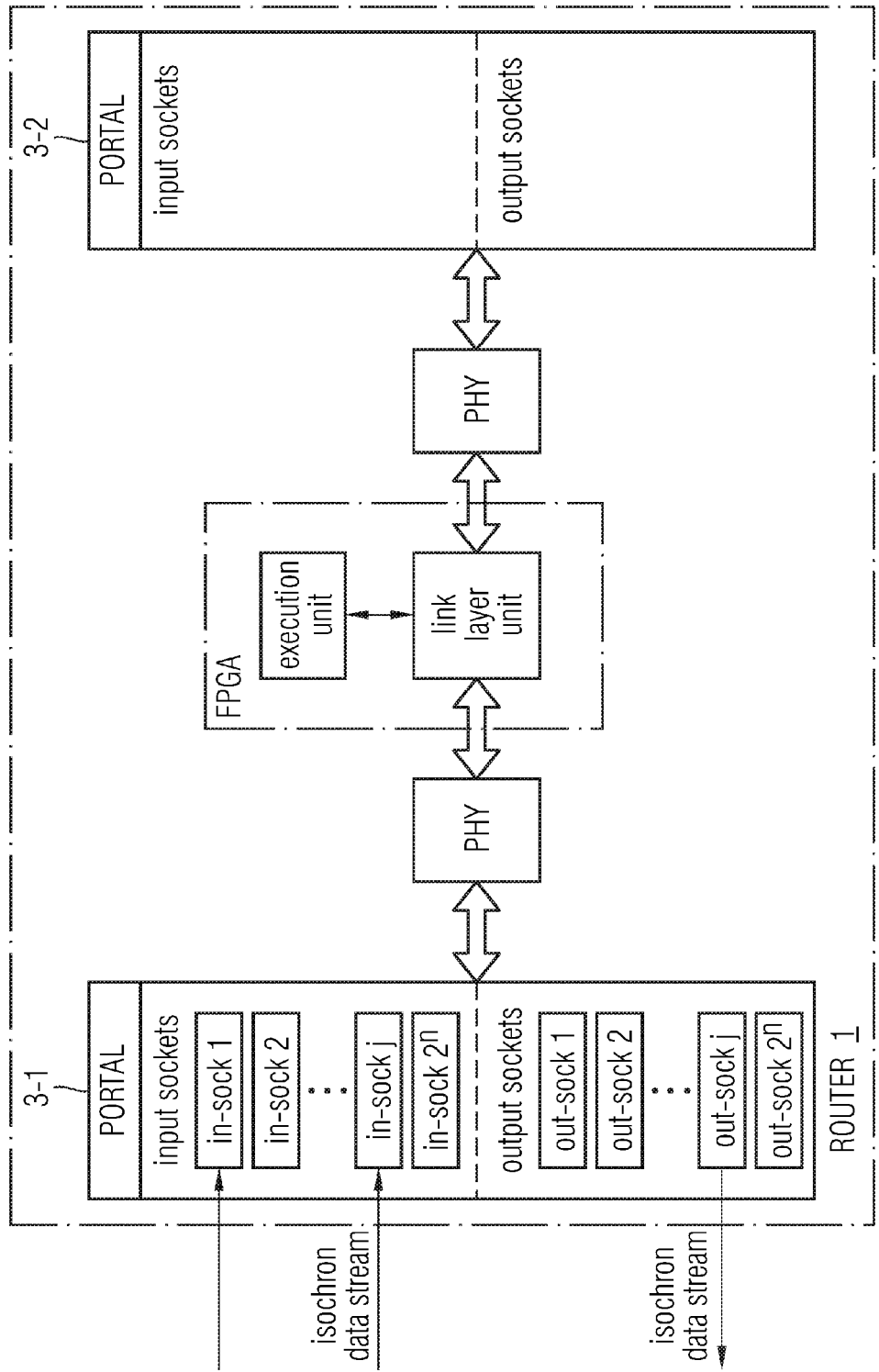
FIG. 5 shows a further block diagram of a possible embodiment of the router according to the present invention.

FIG. 5 shows a block diagram of an embodiment of the router 1 according to the present invention.

The router 1 comprises at least two portals 3-1, 3-2. Each portal 3-1 or 3-2 comprises several input sockets and several output sockets. In a possible embodiment, each portal 3-1 or 3-2 comprises $2^n$ input sockets and $2^n$ output sockets for isochronous data streams. An isochronous socket contains a number of isochronous 'pins'. For each isochronous data stream, a corresponding isochronous socket is provided within the portal 3. A portal 3 can receive in a possible embodiment up to 63 different isochronous data streams. A received isochronous data stream is demultiplexed and applied to the socket pins. Each input socket of the portal 3 is configurable in such a way that it receives isochronous data streams from a transmitting device 5 of a network section connected to the portal 3. A socket is also configurable to rebundle and transmit isochronous data streams to a receiving device of a network section connected to the portal 3 or any of its co-portals. The socket of a portal 3 can comprise one or more parameters. Each parameter comprises non-read-only parameters which are configurable and read-only parameters which are not configurable. The configuration of non-read-only parameters is performed by means of a configuration interface of the router 1. In a possible embodiment, the parameters of a socket are selectable by a user by means of a hierarchical access provided by a menu. In a possible embodiment, each input socket of a portal 3 is configurable to stop receiving data and each output socket of a portal 3 is configurable to stop transmitting data.

The parameters of an input socket of a portal 3 can comprise an isochronous data stream channel number and a number of sequences contained in the isochronous data stream.

The parameters of an output socket of a portal 3 comprise in an embodiment of the router 1 an isochronous data stream channel number, a sample rate, a transmission speed and a number of sequences contained in the isochronous data stream.

As can be seen from FIG. 5, the portal 3 of the router 1 comprises a physical layer (PHY) connected to a link layer unit.

In the embodiment as shown in FIG. 5, the router 1 comprises a Field Programmable Gate Array (FPGA) having an execution unit connected to the link layer unit.

The router 1 provides an on-device remote control over the receipt of isochronous multimedia streams from transmitting devices 5 via a portal 3 of the router that resides on the same bus as the transmitting devices 5. This receipt can be performed by the link layer unit created on the FPGA. Furthermore, in a possible embodiment, an extraction of sequences within these isochronous data streams is performed and these sequences are then rebundled into isochronous data streams for transmission via a co-portal. In a possible embodiment, the rebundling is directed by a set of registers that are provided by a FPGA code and that are configured by a firmware. The actual rebundling can be achieved by a FPGA code. In a possible embodiment, the firmware is instructed via an on-device control or via IP-messages directed at the router 1. Furthermore, a configuration of isochronous multimedia streams transmitted by a portal 3 is directed by registers provided by a FPGA code and accessed via the firmware. In a possible embodiment, the firmware is instructed via an on-device control or via IP-messages directed at the router 1.

The router 1 as shown in FIG. 5 is further capable to perform an on-device and remote control over the creation of an IP-address for each portal 3 of the router 1. The location in the IEEE 1394-address space is provided in a possible embodiment by the firmware. In a possible embodiment, asynchronous accesses of all addresses within the IEEE 1394-address space is handled by a FPGA link layer passed to a transaction layer and dealt with by the firmware. Furthermore, the router 1 as shown in FIG. 5 is capable to perform an on-device and remote control over creation of an IP-routing table. All IP-messages sent to a portal 3 of the router 1 are received by the firmware via the transaction layer. The routing table instructs the firmware as to how the IP-messages are to be processed. In a possible embodiment, the routing table is set up via an on-device control or via IP-messages directed at the router 1.

In a possible embodiment, an IP-packet to be routed is derived from a device on the IEEE 1394-network or via an Ethernet network that in turn might be connected to a wide area network.

With the router 1 according to the present invention it is no longer necessary to address devices outside of a local bus. IP/1394 messages are sent to other devices on the local bus or to a router portal on the same bus. A routing table is set up on the router 1 to send IP-messages directed to the router via a co-portal onwards to a device on a bus local to the co-portal or to yet another router on the bus of the co-portal. It is possible for a device to address any device on any bus as long as the device knows a global node ID, i.e. a bus ID plus a device ID.

The connection management application translates a user request into commands of a predetermined protocol for establishing a first data connection between a transmitting device and the router and a second data connection between the router and a receiving device.

A "user request" can be formed for example by: "set the isochronous channel number of a multicore".

This user request can be translated in a possible embodiment by the connection management application into an analogous structured XFN-message which is wrapped in an IP data packet. The IP data packet in turn is wrapped in an asynchronous 1394 data packet for transmission on the bus.

The router 1 according to the present invention routes isochronous data packets and also IP-messages within asynchronous data packets onwards to the intermediate and final destinations. The router 1 comprises at least two portals, i.e. a portal and a corresponding co-portal. The portal 3 accepts data packets from a connected network and makes these data packets accessible to the router logic of the router 1 for transmission outwards from a further co-portal of the same router 1. Each portal 3 comprises isochronous sockets or multicore sockets each forming an end point of a multicore, i.e. an isochronous datastream.

Figure 6A:
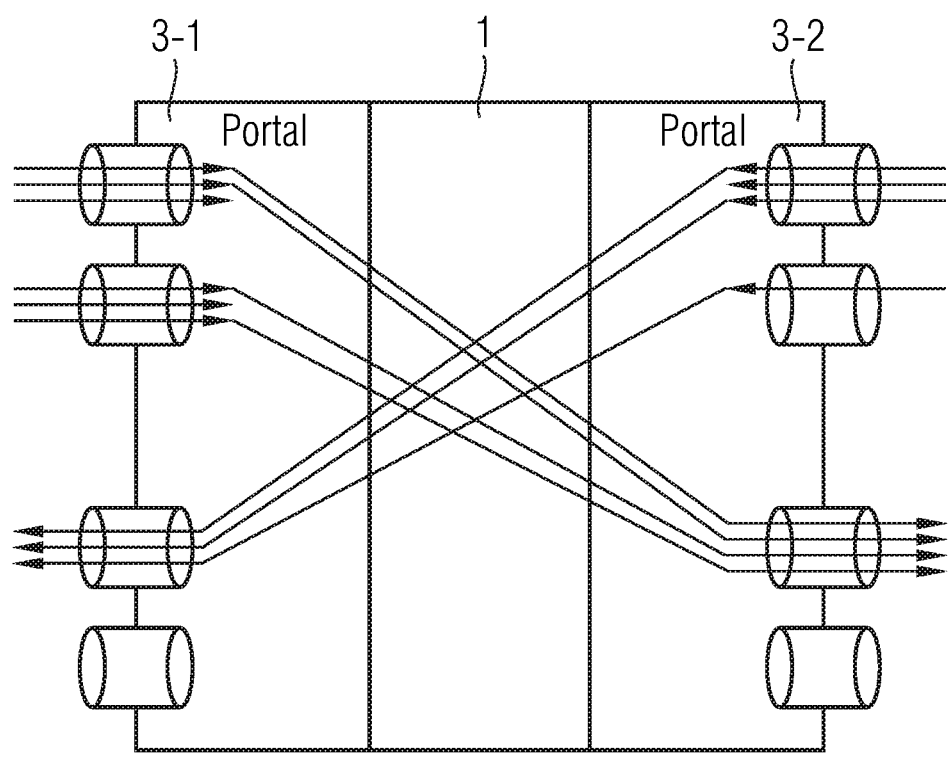
FIGS. 6A, 6B illustrate the rebundling of isochronous data streams by a router according to the present invention.
Figure 6B:
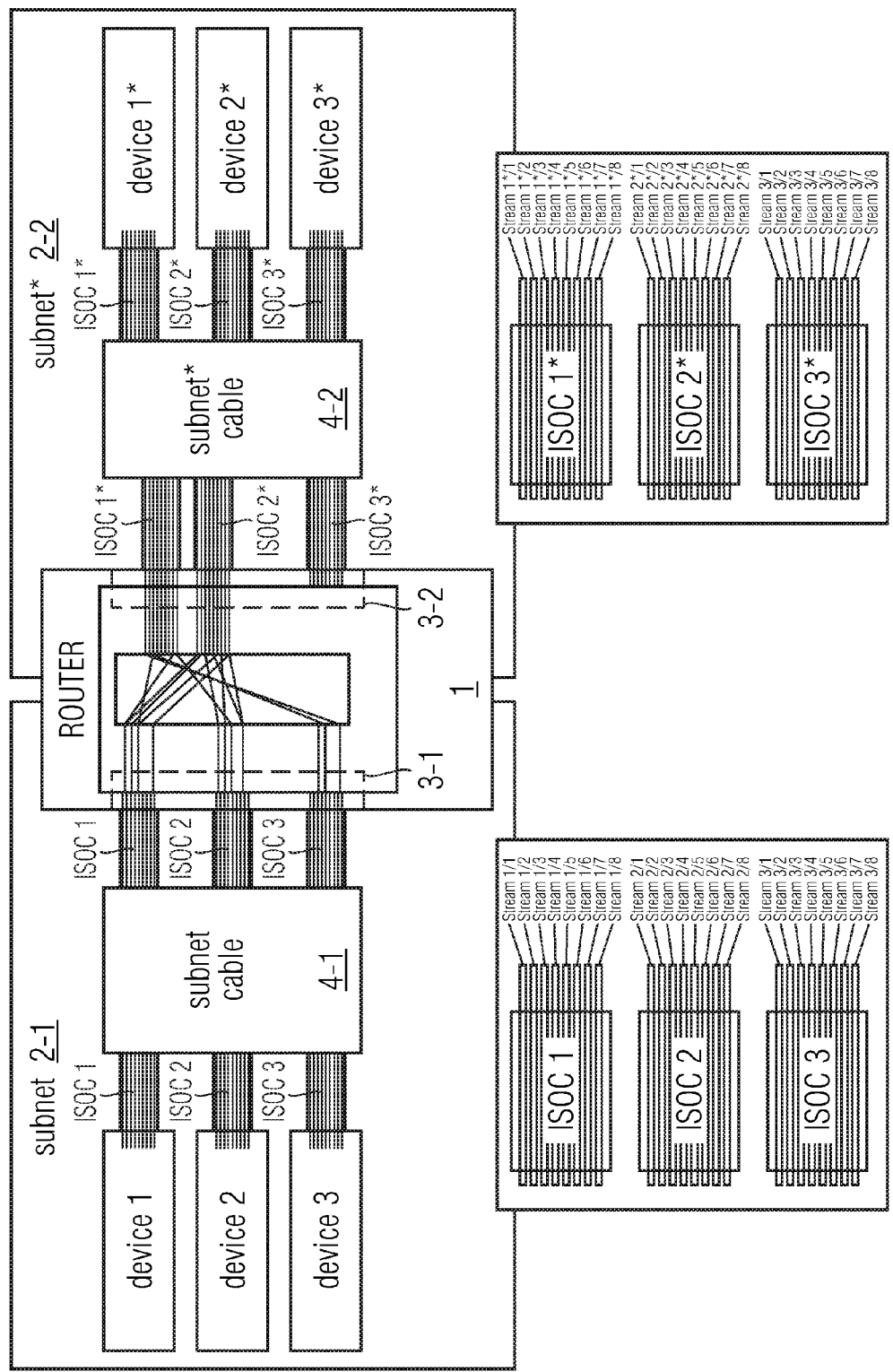

FIGS. 6A, B illustrate the rebundling of isochronous data streams that are performed by an embodiment of the router 1 according to the present invention. In the diagram of FIG. 6A, the portals 3-1, 3-2 comprises two input sockets for receiving isochronous data streams and two output sockets for transmitting isochronous data streams. FIG. 6A illustrates the extraction of sequences of isochronous data streams as well as the rebundling of these sequences.

The router 1 performs a routing of isochronous datastreams from transmitting devices connected to the router by means of a transmitting network section to receiving devices connected to the router via at least one receiving network section. In a possible embodiment the router rebundles isochronous datastreams received from the transmitting devices to optimize a bandwidth of the receiving network section or to optimize a datastream processing capacity of the receiving devices.

Figure 7:
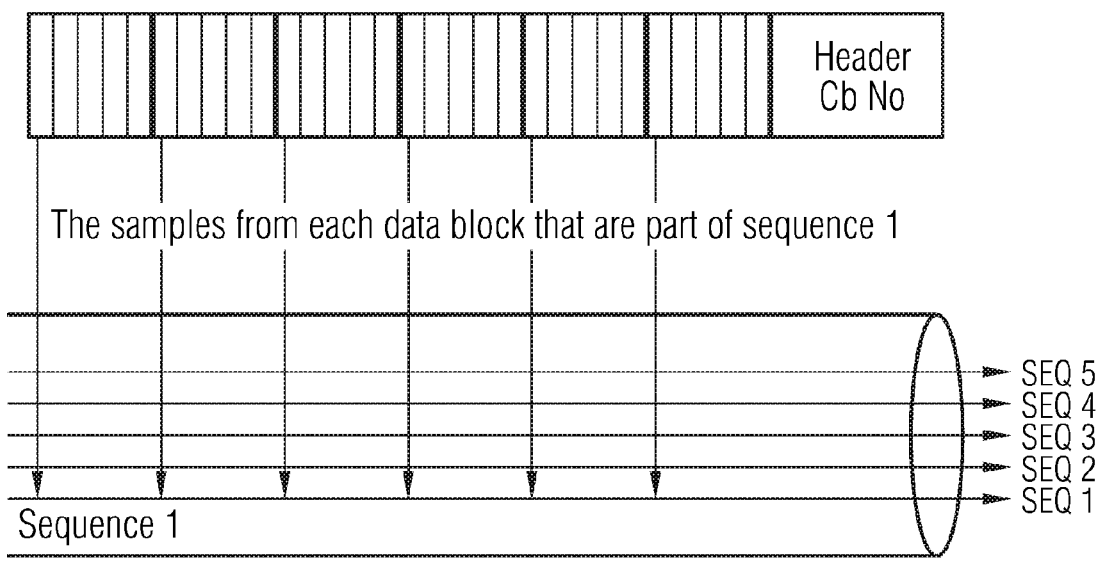
FIG. 7 illustrates an isochronous data stream containing sequences as employed by the router according to the present invention.

FIG. 7 illustrates an isochronous data stream containing sequences. Each isochronous data stream comprises a header (ISOC-header) and several sequences. In the example of FIG. 7, the isochronous data stream comprises five sequences, for example audio streams. Samples from each data block form part of a sequence SEQ. A sequence, such as an audio sequence, can also be referred to as a cable. In a possible embodiment of the router 1, the socket of a portal 3 is capable of receiving multi-core cables containing a number of data cables.

Figure 8:
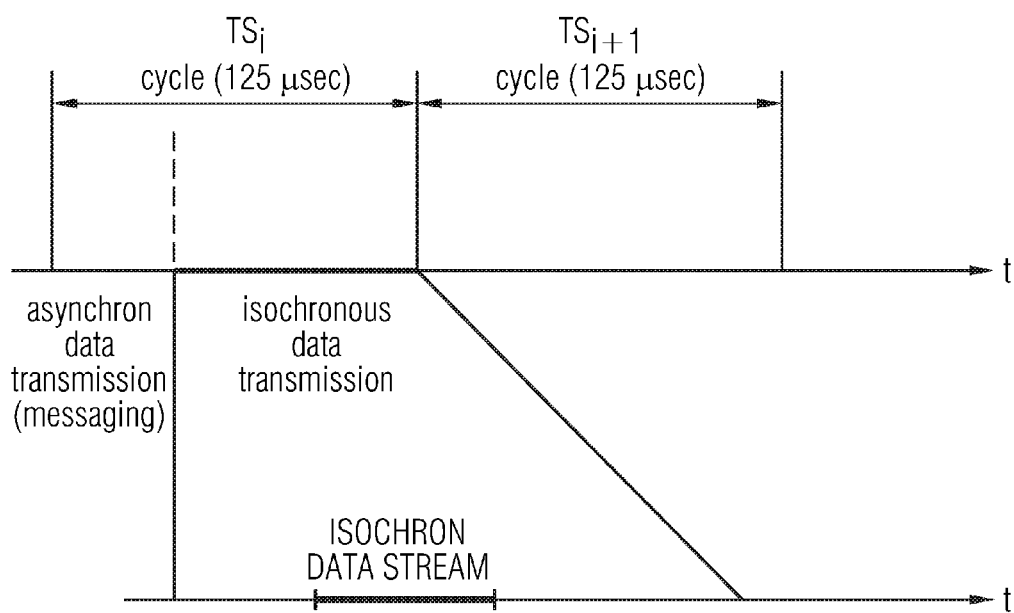
FIG. 8 shows signal diagrams for illustrating the functionality of a router according to the present invention.

FIG. 8 shows diagrams for illustrating the timing of a data transmission as employed by the router 1 according to the present invention. In a possible embodiment, the isochronous data transfer protocol employed by the router 1 comprises time slots TS each having a constant cycle length of e.g. 125 microseconds. A constant share of each time slot TS is provided for asynchronous data transmission of control data packets (messages) and a constant share of each time slot TS is provided for data transmission of isochronous data streams. In a possible embodiment, up to 80% of each time slot TS can be reserved for isochronous data transmission.

Figure 9:
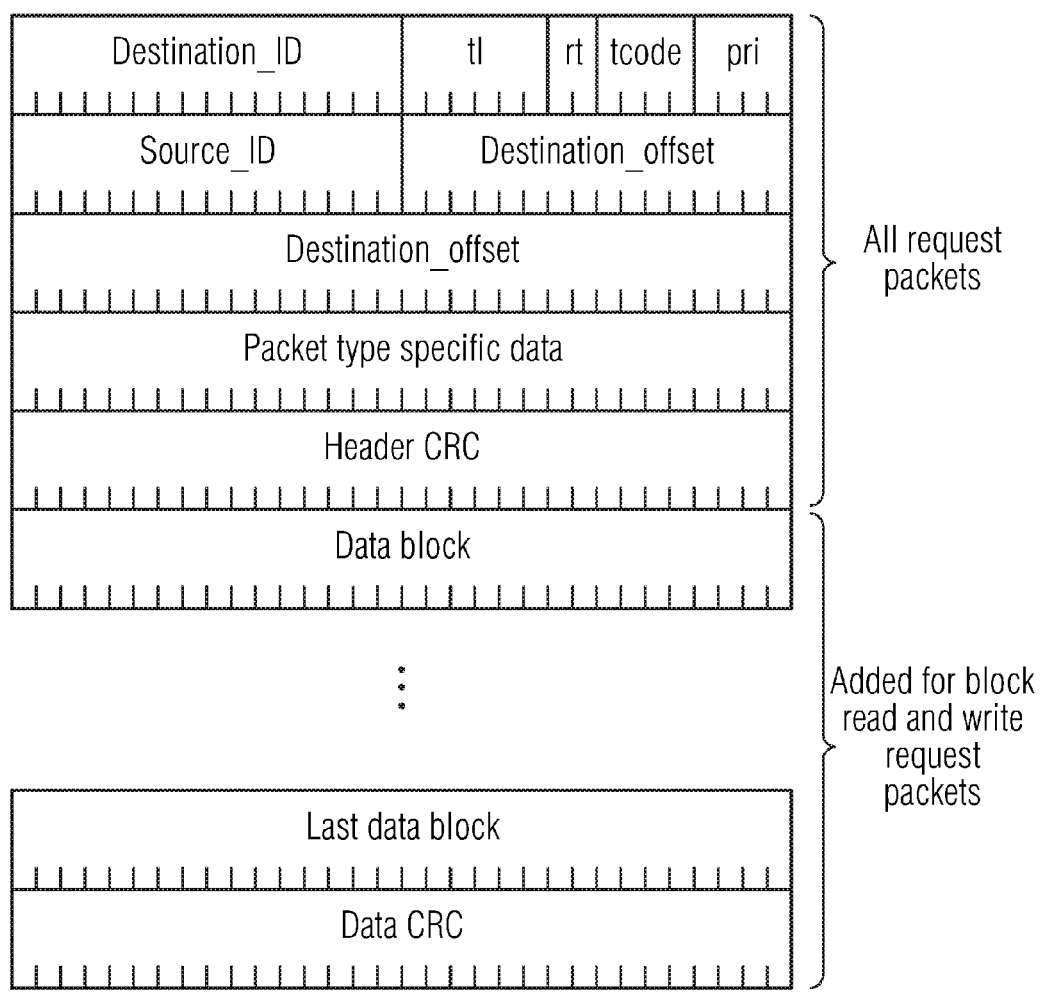
FIG. 9 shows a data packet format of an asynchronous data packet as used in an embodiment of the router according to the present invention.

FIG. 9 shows an example of a data format of an asynchronous data packet transmitted during asynchronous data transmission. A control data packet or message can have the data format as shown in FIG. 9. As can be seen from FIG. 9, the asynchronous data packet comprises a destination-ID, a source-ID, a destination off-set, packet type specific data, a header CRC of data blocks and data CRC. The destination-ID together with the destination off-set defines a memory address of 64 bits.

FIG. 10 shows an example of a data format of an isochronous data packet transmitted during isochronous data transmission. The isochronous data packet comprises a header indicating a data length comprising a tag, an isochronous channel number, an IP-code and a synchronization code (SY). The data length specifies the number of bytes of data. The isochronous data format tag is used for higher level protocols, such as the common isochronous protocol (CIP). The isochronous channel number specifies an isochronous channel or data stream assigned to the data packets. The t-code is a transaction code for isochronous transactions. The synchronization code SY is application specific. This data field can be used by a digital transmission copy protection standard.

Figure 11:
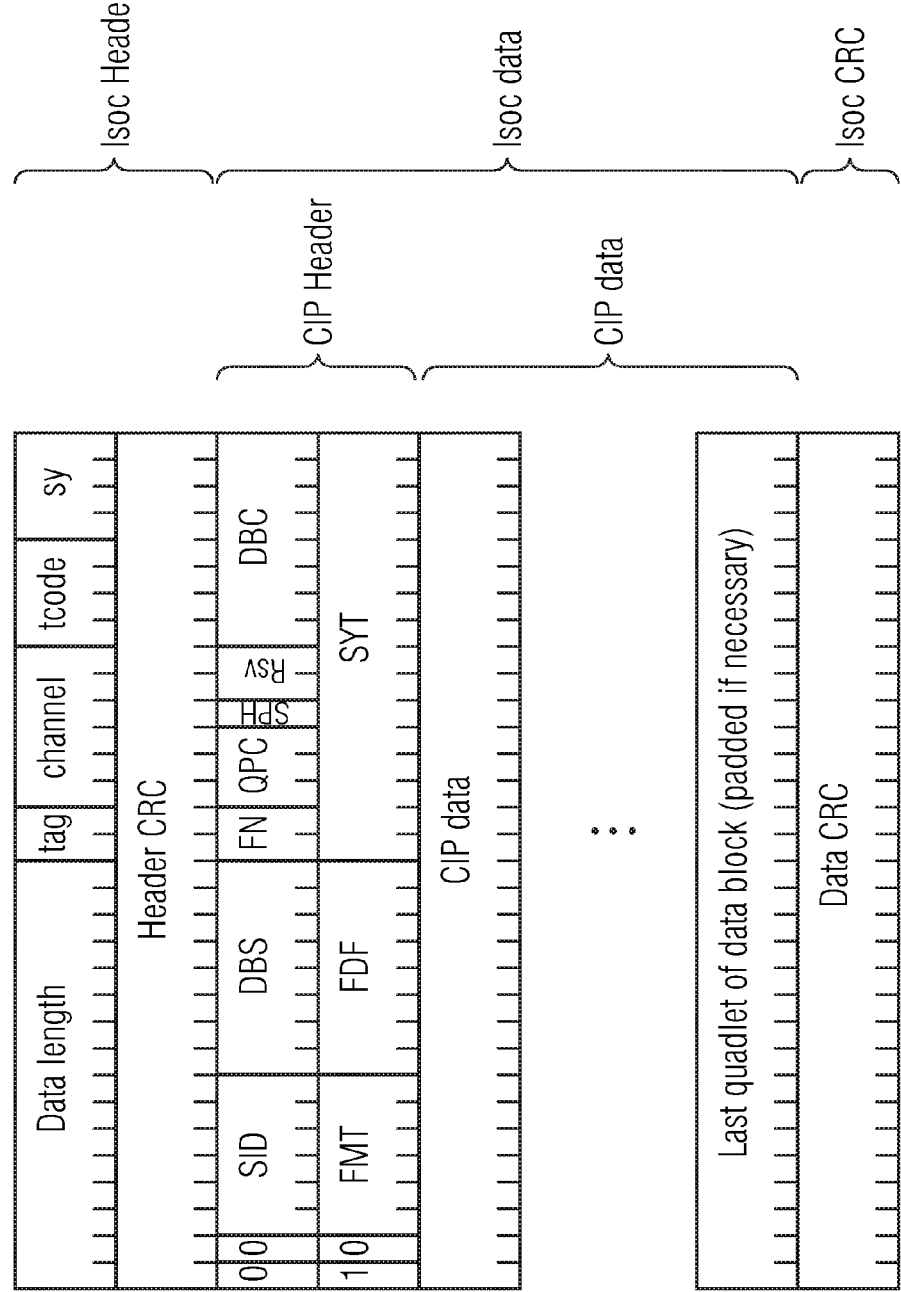
FIG. 11 shows the Common Isochronous Packet (CIP) format as it occurs within the payload of an isochronous data packet and as it is employed in an embodiment of the router according to the present invention.

FIG. 11 shows an example for a data format of a common isochronous data packet. The CIP-header comprises a source identifier SID having a n=6 bit physical-ID of the node or device transmitting the data packet. The DBS-field contains a data block size. The CIP data section contains audio visual data that is clustered into one or more data blocks. The FN-field as shown in FIG. 11 contains a value that indicates the number of fractions into which the original application packet is divided. The QPC (Quadlet Padding Count) contains a value that indicates a number of padding bits added to each application frame to make it divide evenly into $2^{fn}$ data blocks. The SPH-field indicates if a transport delay time has been added by the transmitter. The DBC-field holds a count of data blocks while the FMT-field identifies the data type using the CIP. The FDF is the format dependency used to identify subformats or convey other information. The SYT-field indicates the time that a particular data block (event) within the packet can be presented at the receiver.

Any particular node or device can only transmit an isochronous packet every 125 μsec. as shown in FIG. 8. This corresponds to a transmission rate of 8000 data packets/sec.

Audio samples need to be transmitted at far faster rates, such as 44100, 44800, 88200 or 96000 samples/sec. More than one sample has to be packaged into a CIP-data section before transmission. This simultaneous availability of samples and MIDI-data on the transmitter side is referred to as an event. The data block contains all the data that makes up an event. These data blocks appear in the CIP-data section of the isochronous data packet. The FMT-field of the CIP-header contains a value indicating that a data packet comprises data conforming to an audio and music data transmission protocol. For 48 KHz audio there are typically six data blocks in each isochronous data packet. The isochronous data packets are transmitted from a device at a rate of 8 KHz. The isochronous data stream comprises a continuous flow of data packets, wherein each data packet has data blocks. This data stream comprises a number of sequences, wherein each sequence corresponds to a particular data block position as illustrated in FIG. 7.

Figure 12:
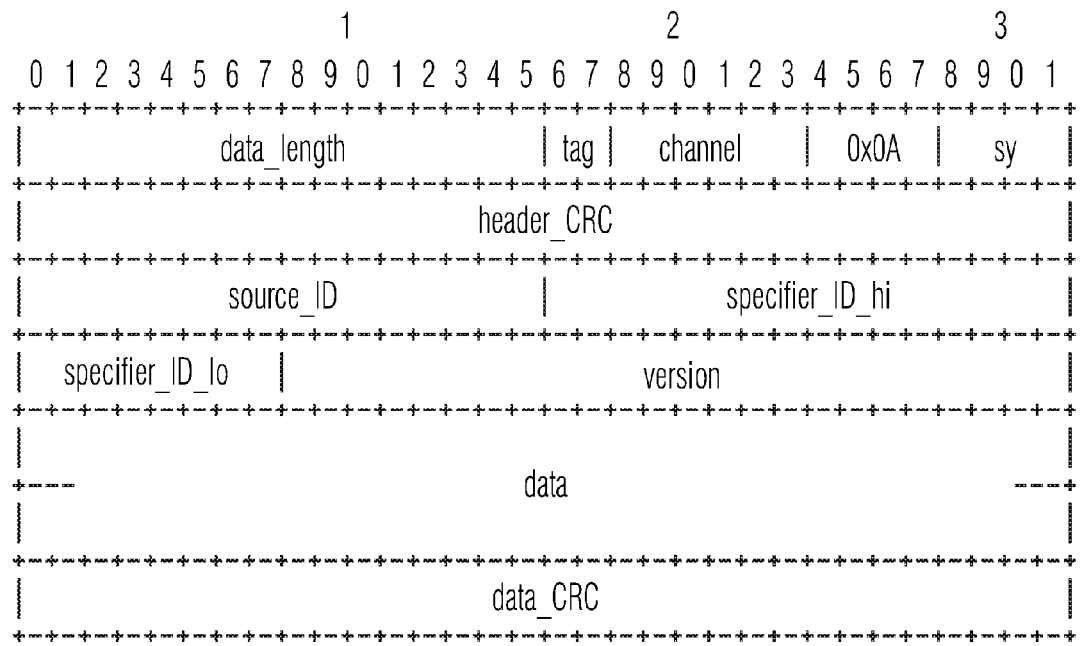
FIG. 12 shows a packet format of a global asynchronous stream packet (GASP) as employed by an embodiment of the router according to the present invention.

FIG. 12 shows an example of a global asynchronous stream packet (GASP). Some IP-data streams as well as 1394-ARP-requests and responses are transported via asynchronous stream packets. Some asynchronous stream packets conform to the global asynchronous stream packet (GASP) format as specified by IEEE P1394a as shown in FIG. 12.

FIG. 13 shows an example of a data entry within a routing table as used by the IP-stack module 9 as shown in FIG. 2.

Figure 14:
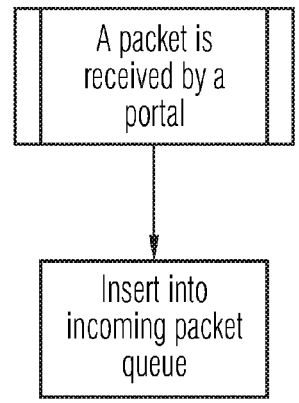
FIG. 14 illustrates a receipt of a data packet by a router according to the present invention.

FIG. 14 illustrates the receipt of an IEEE 1394-data packet by the router 1 according to the present invention.

When a data packet is received by a portal 3 of the router 1, it is inserted into an incoming packet queue as shown in FIG. 14. The packet queue holds incoming IEEE 1394-data packets received by the portal 3. When a data packet is inserted in the message queue, a thread is activated to process the data packets.

Figure 15:
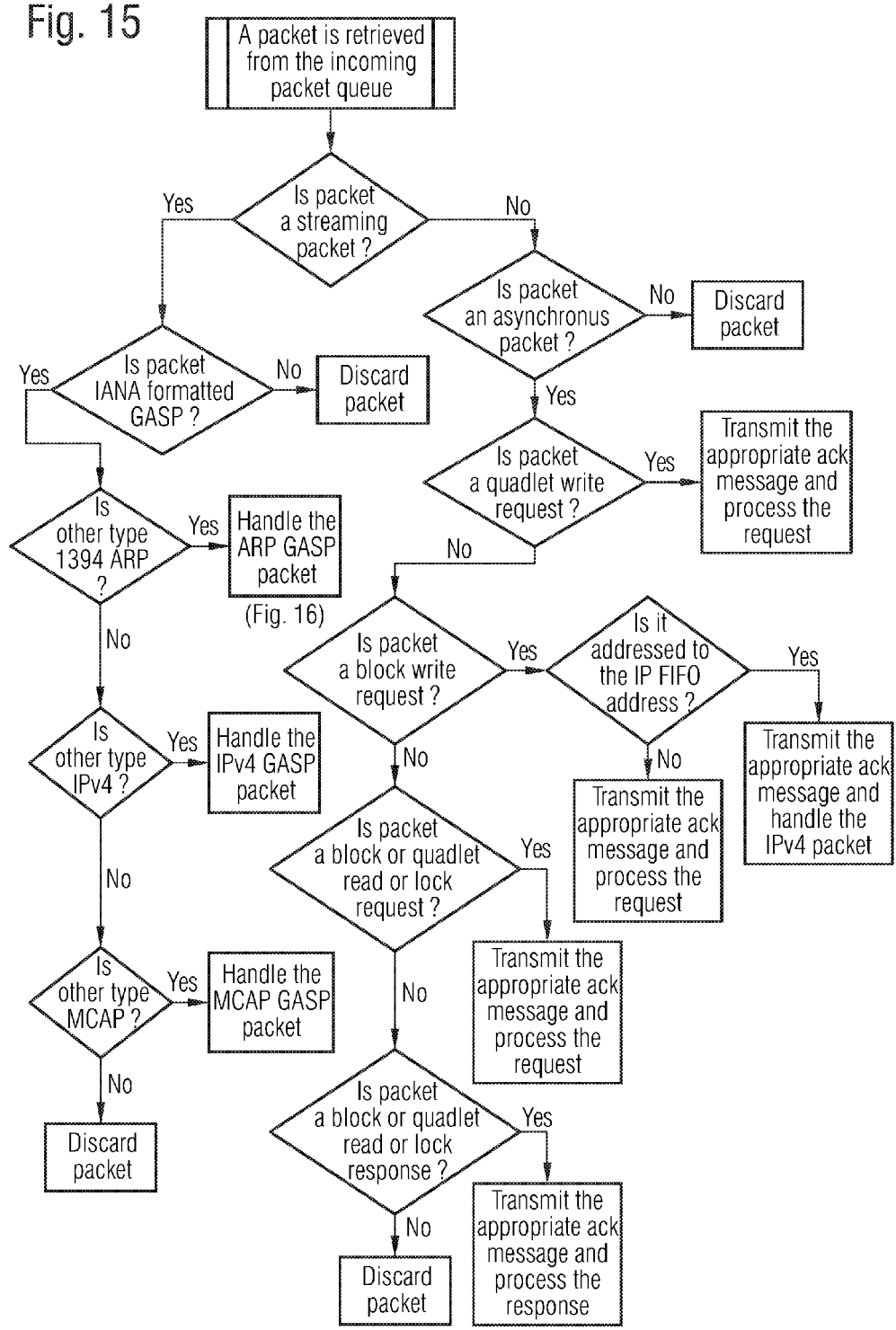
FIG. 15 is a flow chart illustrating the processing of data packets by a router according to the present invention.
Figure 16:
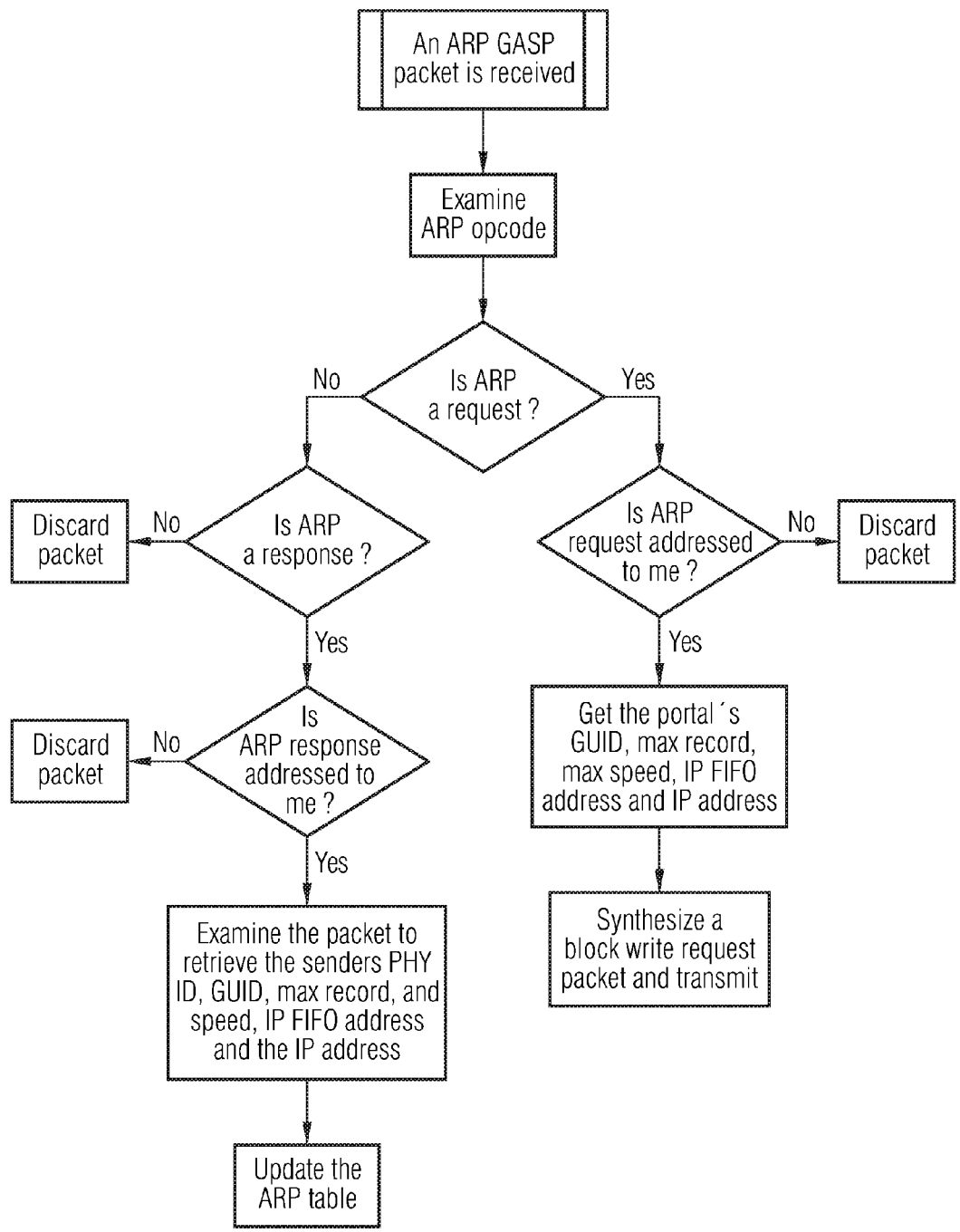
FIG. 16 is a flow chart illustrating the handling of GASP data packets by a router according to the present invention.
Figure 17:
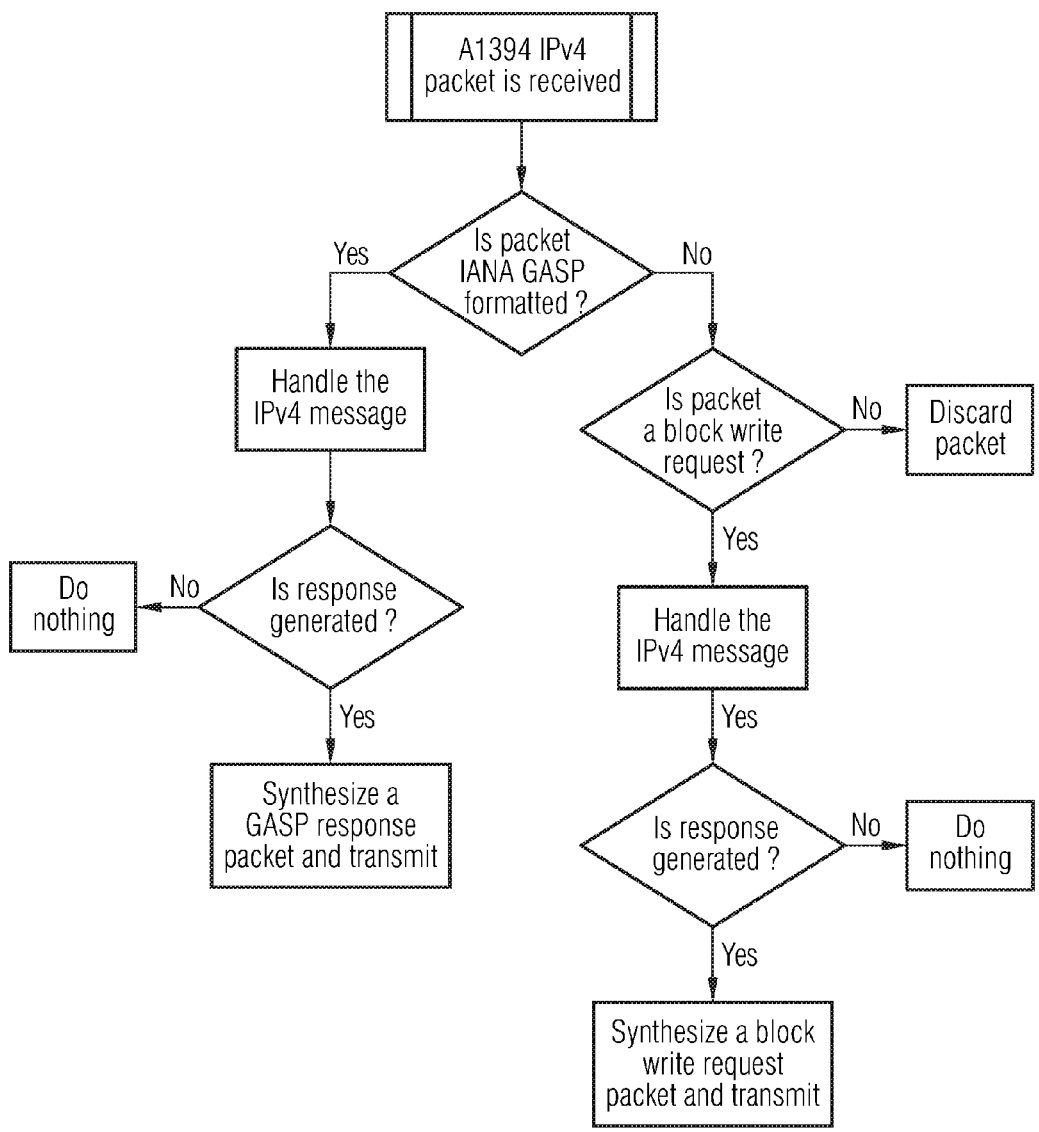
FIG. 17 shows a flow chart illustrating the handling of IEEE 1394 IPV4 data packets by a router according to the present invention.

FIG. 15 shows an exemplary flowchart of an embodiment of the handling of data packets by the router 1 according to the present invention. The handling of ARPGASP-data packets is shown in more detail in FIG. 16. The handling of 1394-data packets is shown in more detail in FIG. 17. The router 1 according to the present invention performs selected routing and rebundling of IEEE 1394-multimedia streams and IP-packets.

The router 1 according to the present invention can be used in many different applications.

For example, the router 1 can be used for audio data streams. For example, front-of-house and stage audio devices can be connected to separate buses. The router 1 according to the present invention can link these two buses with their respective devices. Further, amplifier clusters can be on separate buses. The router 1 according to the present invention can link these amplifier clusters.

Each device on a stage can transmit on its own isochronous channel providing a corresponding isochronous data stream. The rebundling as performed by the router 1 allows bandwidth and channel saving and transmitting from stage to front-of-house devices and vice versa. The capability of multiple buses for amplifier clusters and tables enables an unlimited number of amplifiers. Furthermore, it is possible to create IP-based control access rights to devices on any bus.

A further application of the router 1 according to the present invention is within studios. In large multi-studio complexes, each studio can have its own bus being linked to other studios via the router 1 according to the present invention. This provides the advantage that each studio will be unaffected by bus resets that occur on remote studio buses. Each studio will be unaffected by bandwidth and channel resource allocation taking place on buses in remote linked studios. Furthermore, each studio will be able to transmit one or more data streams of multimedia data to remote linked studios.

In a further application, the router 1 according to the present invention can be provided within a location, such as hotels and convention centers. Audio and video devices that reside in zones within hotels and convention centers can each be allocated to a bus. For studios, each zone can be unaffected by bus resets that occur on remote buses. Furthermore, each zone will be unaffected by bandwidth and channel resource allocation taking place on buses in remote linked zones. Furthermore, each zone will be able to transmit one or more streams of multimedia data to remote linked zones. It is possible via access rights to control IP-based messages across the router 1 and, hence, the streaming of multimedia streams across zones.

A further possible field of use for the router 1 according to the present invention is in locations like law courts and parliamentary buildings. Audio and video devices that reside in different chambers can each be allocated a bus. As for studios, hotels and convention centers, each chamber will be unaffected by bus resets that occur on remote buses. The chamber will also be unaffected by a bandwidth and channel resource allocation taking place on buses in remote linked chambers. Furthermore, each chamber will be able to transmit one or more streams of multimedia data to remote linked chambers. Furthermore, it is possible via access rights to control the routing of IP-based control messages across the router 1 and, hence, the stream of multimedia streams across these chambers.

The IP-router 1 according to the present invention allows stream rebundling. Multiple isochronous streams can be received by a portal 3 of the router 1 from a bus 4 that is associated. Sequences can be extracted from one or more of these isochronous streams and rebundled into a single isochronous stream. This single isochronous stream can then be sent to an output portal of the router 1 for transmission over its associated bus. The control of this data stream rebundling is performed by means of control messages of a stack of the router 1. The data stream rebundling has the advantage that the number of isochronous data streams transmitted on a bus is reduced. The number of isochronous data streams on a bus or network section is limited to 63. The rebundling avoids that this limit is reached. Furthermore, this isochronous data stream rebundling performed by the router 1 according to the present invention reduces a time wastage caused by multiple streams arbitrating for transmission on the bus.

The invention claimed is:

1. A router for providing isochronous data transfer and asynchronous data transfer on the basis of a predetermined protocol between devices of different network sections connected to said router, wherein a connection management application executed by said router translates a user request to transfer data from a transmitting device of a first network section to a receiving device of a second network section into commands of said protocol for establishing a first data connection between said transmitting device and said router and a second data connection between said router and said receiving device, wherein said data is transferred from said transmitting device via the established data connections to said receiving device, wherein for each portal of said router a corresponding configurable IP-address and a configurable host name is stored in a memory of said router, the router comprising:
  an IP/1394 module for each portal for handling IP/1394 data packets each having
  an IP/1394 header and for handling ARP data packets,
  an IP-stack module for handling IP-data packets each having an IP-header,
  an UDP-module for handling UDP-data packets each having an UDP-header, and
  a command and control module for handling control data packets of a connection management application,
  wherein said control data packets are formatted according to a hierarchical command and control protocol;
  wherein said IP-stack module comprises
  a configurable routing table,
  wherein each entry of said routing table comprises a subnet address of a network section connected to a portal of said router, a subnet mask for said network section, an indication whether the routing is direct or not, a portal number of a portal of said router capable of forwarding a received data packet to the receiving device, an IP-address of another router capable of forwarding a received data packet to said receiving device.

2. The router according to claim 1,
wherein the transferred data is formed by isochronous data or by asynchronous data.

3. The router according to claim 2,
wherein said transferred isochronous data comprises isochronous data streams which are formed by time constrained data streams.

4. The router according to claim 1,
wherein said router comprises at least two portals for receiving and transmitting data packets of a network section connected to said portal,
wherein a data packet received by a portal is inserted into an incoming message queue of said portal,
wherein when a data packet is inserted into a message queue of said portal a thread is activated to process the data packets of said message queue.

5. The router according to claim 1,
wherein each device comprises a non-permanent device identification having n bits, wherein each portal of said router comprises
$2^n$ output sockets for transmitting isochronous data streams via a network section connected to said portal and
$2^n$ input sockets for receiving isochronous data streams via said network section connected to said portal.

6. The router according to claim 5,
wherein each output socket of a portal is configurable to stop transmitting data and wherein each input socket of a portal is configurable to stop receiving data.

7. The router according to claim 5,
wherein each input socket of a portal is configurable in such a way that it will receive isochronous data streams from a transmitting device of a network section connected to said portal and
wherein each input socket of a portal is configurable to rebundle and transmit isochronous data streams to a receiving device of a network section connected to said portal or any of its co portals.

8. The router according to claim 5,
wherein each non-read-only parameter of a socket of a portal is configurable and
wherein parameters of a socket are selectable by a user by means of a hierarchical access provided by a menu.

9. The router according to claim 5,
wherein parameters of an input socket of a portal comprise an isochronous data stream number and
a number of sequences contained in said isochronous data stream,
wherein parameters of an output socket of a portal comprise
an isochronous data stream number,
a sample rate,
a transmission speed, and
a number of sequences contained in said isochronous data stream.

10. The router according to claim 1,
wherein the router processes control data packets of a hierarchical command and control protocol received at a portal of said router.

11. The router according to claim 1,
wherein each portal comprises a physical layer for an isochronous and asynchronous data transfer protocol.

12. The router according to claim 1,
wherein said network section comprises a subnet to which devices are connected,
wherein each device comprises a permanent device IP-address having m bits.

13. The router according to claim 1,
wherein each isochronous data stream transmitted by a device comprises
a header having an n bit data stream channel number of said transmitting device and payload data consisting of time constrained data.

14. The router according to claim 1,
wherein the isochronous data transfer protocol comprises time slots each having a constant cycle length of 125 μsec,
wherein a constant share of each time slot is provided for asynchronous data transmission of control data packets (messages) and
a constant share of each time slot is provided for isochronous data transmission of isochronous data streams.

15. The router according to claim 1,
wherein said router comprises an execution unit for executing said connection management application formed by a Field Programmable Gate Array (FPGA),
wherein a physical layer of each portal is connected to a link layer unit of said Field Programmable Gate Array (FPGA).

16. The router according to claim 1,
wherein said router is a multimedia data stream router which routes isochronous multimedia data packets and IP-data packets between network sections connected to portals of said multimedia data stream router.

17. The router according to claim 1,
wherein the router comprises an input unit to input said user request,
wherein said user request is received by said connection management application or
wherein said user request is received by an external device.

18. A method for transferring data from a transmitting device of a network section to a receiving device of another network section comprising the steps of:
(a) providing commands of an isochronous data transfer protocol for establishing a first data connection between said transmitting device and a router and for establishing a second data connection between said router and said receiving device;
(b) transferring said data via the established data connections from said transmitting device to said receiving device via said router, wherein for each portal of said router a corresponding configurable IP-address and a configurable host name is stored in a memory of said router, the router comprising:

an IP/1394 module for each portal for handling IP/1394 data packets each having an IP/1394 header and for handling ARP data packets, an IP-stack module for handling IP-data packets each having an IP-header, an UDP-module for handling UDP-data packets each having an UDP-header, and a command and control module for handling control data packets of a connection management application, wherein said control data packets are formatted according to a hierarchical command and control protocol;

wherein said IP-stack module comprises a configurable routing table, wherein each entry of said routing table comprises a subnet address of a network section connected to a portal of said router, a subnet mask for said network section, an indication whether the routing is direct or not, a portal number of a portal of said router capable of forwarding a received data packet to the receiving device, an IP-address of another router capable of forwarding a received data packet to said receiving device.

* * * * *

UNITED STATES PATENT AND TRADEMARK OFFICE
CERTIFICATE OF CORRECTION

PATENT NO.      : 8,571,045 B2                      Page 1 of 1
APPLICATION NO. : 12/681251
DATED           : October 29, 2013
INVENTOR(S)     : Gurdan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this
Twenty-second Day of September, 2015

Michelle K. Lee
*Director of the United States Patent and Trademark Office*